United States Patent
Iwaki

(10) Patent No.: US 7,172,043 B2
(45) Date of Patent: Feb. 6, 2007

(54) CONSTANT SPEED RUNNING CONTROL APPARATUS FOR VEHICLE AND METHOD THEREOF

(75) Inventor: Haruhiro Iwaki, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 256 days.

(21) Appl. No.: 10/743,498

(22) Filed: Dec. 23, 2003

(65) Prior Publication Data
US 2004/0134701 A1   Jul. 15, 2004

(30) Foreign Application Priority Data
Dec. 27, 2002   (JP)   ............. 2002-382344

(51) Int. Cl.
*B60K 31/00*   (2006.01)
*B60T 8/32*   (2006.01)
(52) U.S. Cl. ........................... 180/170; 701/93
(58) Field of Classification Search ............... 701/93, 701/94, 95, 54, 51, 55; 180/170, 178, 179, 180/177, 176
See application file for complete search history.

(56) References Cited

U.S. PATENT DOCUMENTS

| | | | |
|---|---|---|---|
| 4,516,652 A * | 5/1985 | Tanigawa et al. ........... 180/177 |
| 4,736,813 A * | 4/1988 | Hayama et al. ............. 180/177 |
| 4,933,859 A * | 6/1990 | Tsuyama et al. ............. 701/93 |
| 4,939,657 A * | 7/1990 | Imai et al. .................. 701/95 |
| 5,010,490 A * | 4/1991 | Naito et al. ................. 701/95 |
| 5,270,934 A * | 12/1993 | Kobayashi .................. 701/95 |
| 5,329,454 A * | 7/1994 | Takada et al. ............... 701/95 |
| 6,138,071 A * | 10/2000 | Sekine et al. ............... 701/93 |
| 6,311,117 B1 * | 10/2001 | Winner et al. .............. 701/93 |
| 7,010,408 B2 * | 3/2006 | Kitazawa et al. ............ 701/70 |

FOREIGN PATENT DOCUMENTS

JP   8-300980 A   11/1996

* cited by examiner

*Primary Examiner*—Christopher P. Ellis
*Assistant Examiner*—Vaughan Coolman
(74) *Attorney, Agent, or Firm*—Foley & Lardner LLP

(57) ABSTRACT

When a constant speed running control is released during a changing operation of target vehicle speed, a target vehicle speed in just before the changing operation of target vehicle speed is set to a target vehicle speed at the time when the constant speed running control is resumed.

19 Claims, 4 Drawing Sheets

CONSTANT SPEED RUNNING CONTROL APPARATUS FOR VEHICLE AND METHOD THEREOF

FIELD OF THE INVENTION

The present invention relates to a constant speed running control apparatus for a vehicle and a method thereof, and in particular to a technique for setting a target vehicle speed.

RELATED ART

Japanese Unexamined Patent Publication No. 08-300980 discloses a constant speed running apparatus provided with a switch increasing a target vehicle speed (acceleration switch) and a switch reducing the target vehicle speed (coast switch), capable of arbitrary changing the target vehicle speed by operating the switches.

In such a constant speed running apparatus, if a braking operation and the like are performed during a constant speed running control, the constant speed running control is released, but when the constant speed running control is resumed by an operation of resume switch, the target vehicle speed at the release time is again set.

Even though the target vehicle speed is increased by the operation of the acceleration switch, if the running road is an up-hill, an actual vehicle speed is delayed in following the increase of target vehicle speed.

Therefore, there may be caused the large deviation between the target vehicle speed and the actual vehicle speed, resulting in that a driver increases the target vehicle speed needlessly.

As described above, in a state where the target vehicle speed greatly exceeds the actual vehicle speed, if the constant speed running control is released by the braking operation, and the target vehicle speed at the release time is set to the target vehicle speed at the time when the constant speed running control is resumed, there is a possibility that a vehicle speed over a driver's request is generated when the constant speed running control is resumed.

Contrary to the above, if the constant speed running control is released when an operation of reducing the target vehicle speed is performed on a down-hill, there is a possibility that the target vehicle speed is controlled to be lower than that requested by the driver when the constant speed running control is resumed.

SUMMARY OF THE INVENTION

The present invention has an object to provide a control apparatus and a control method in which, even if a constant speed running control is released during an increasing or reducing operation of a target vehicle speed, the target vehicle speed is not set to be increased or reduced over an intention of a driver when the constant speed running control is resumed.

In order to achieve the above object, the present invention is constituted so that, when a constant speed running control is released during an operation of changing a target vehicle speed, a vehicle speed delayed to follow a change instruction for the target vehicle speed is set to the target vehicle speed at the time when the constant speed running control is resumed.

The other objects and features of this invention will become understood from the following description with reference to the accompanying drawings.

PREFERRED EMBODIMENT

Figure 1:
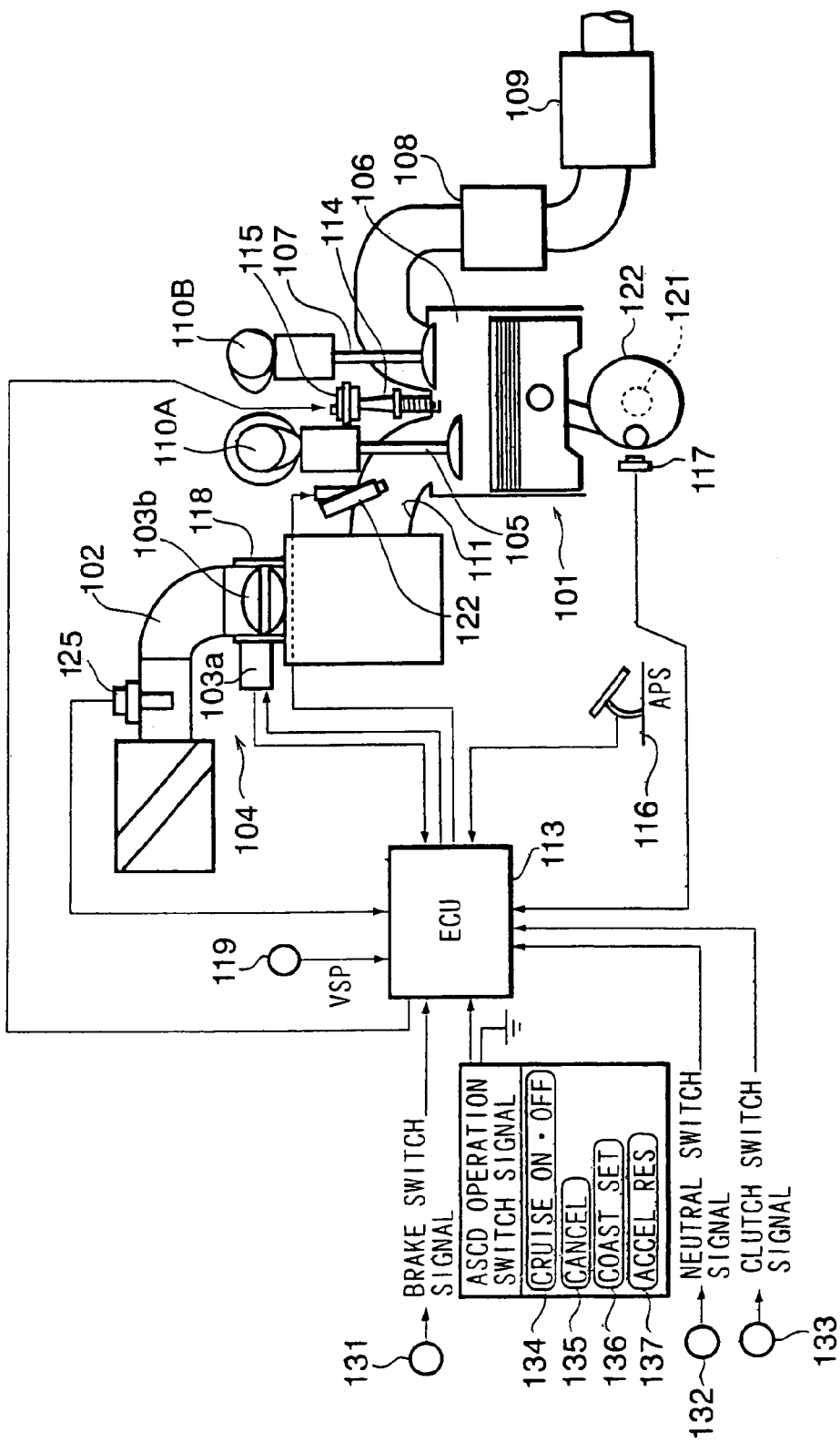
FIG. 1 is a diagram showing a system configuration of an internal combustion engine for vehicle including a constant speed running control apparatus in an embodiment.

FIG. 1 is diagram showing a system configuration of an internal combustion engine for vehicle including a constant speed running control apparatus.

In FIG. 1, in an intake pipe 102 of an internal combustion engine 101, an electronically controlled throttle 104 is disposed.

In electronically controlled throttle 104, a throttle valve 103b is driven to open and close by a throttle motor 103a.

Air is sucked into a combustion chamber 106 of internal combustion engine 101 via electronically controlled throttle 104 and an intake valve 105.

A combusted exhaust gas is discharged from combustion chamber 106 via an exhaust valve 107, purified by a front catalyst 108 and a rear catalyst 109, and then emitted into the atmosphere.

Intake valve 105 and exhaust valve 107 are driven to open and close by cams disposed to an intake side camshaft 110A and an exhaust side camshaft 110B, respectively.

Further, an electromagnetic fuel injection valve 112 is disposed on an intake port 111 at the upstream side of intake valve 105 of each cylinder.

Fuel injection valve 112 injects fuel adjusted at a predetermined pressure toward intake valve 105 when driven to open by an injection pulse signal for each cylinder output from an engine control unit 113.

The air-fuel mixture formed in the cylinder is spark ignited by an ignition plug 114 to be burnt.

An ignition coil 115 incorporating therein a power transistor is disposed to each ignition plug 114. Engine control unit 113 performs a switching control of each power transistor, to control ignition timing of each cylinder independently.

A power torque of internal combustion engine 101 is transmitted to a driving wheel via a transmission.

Engine control unit 113 receives various detection signals from an air flow meter 125 detecting an intake air amount Q of engine 101, an accelerator pedal sensor 116 detecting an accelerator pedal opening, a crank angle sensor 117 taking out a position signal POS for each unit crank angle, a throttle sensor 118 detecting an opening TVO of throttle valve 103b, and a vehicle speed sensor 119 detecting a vehicle speed.

Then, engine control unit 113 outputs control signals to throttle motor 103a, fuel injection valve 112 and the power transistor by the calculation process based on the detection signals.

Further, engine control unit 113 is provided with a function of controlling constant speed running, and receives signals of various operating switches for the constant speed running control, and also receives a signal from a brake switch 131 detecting the depression of a brake pedal, a signal from a neutral switch 132 detecting whether or not a transmission combined with internal combustion engine 101 is in a neutral position, and further a signal from a clutch switch 133 indicating the on-off of the clutch in the case where the transmission is a manual transmission.

As various operating switches for the constant speed running control, there are provided a cruise ON/OFF switch 134 corresponding to a main switch, an acceleration resume switch 137, a coast set switch 136 and a cancel switch 135.

In the constant speed running control system as described above, throttle motor 103a is feedback controlled so that an actual vehicle speed detected by vehicle speed sensor 119 reaches a target vehicle speed.

The summary of operating method of constant speed running control system is as follows.

If cruise ON/OFF switch 134 is pushed, and coast set switch 136 is pushed when the vehicle speed is a desired vehicle speed, the vehicle speed at the time is set to the target vehicle speed.

When the target vehicle speed is to be increased, if acceleration resume switch 137 continues to be pushed, then the target vehicle speed is increased. On the other hand, when the target vehicle speed is to be reduced, if coast set switch 136 continues to be pushed, then the target vehicle speed is reduced.

Further, when the vehicle speed is to be increased temporarily, if an accelerator pedal is depressed, the vehicle speed is increased, while returning the constant speed running at the target vehicle speed if the accelerator pedal is returned.

Moreover, during the constant speed running control, the constant speed running control is released on the following conditions:
  a) depressing the brake pedal;
  b) setting an A/T select lever to the neutral position (turning off the clutch in M/T);
  c) the case where the vehicle speed is reduced by a predetermined speed or more (for example, 13 km/h) from the target vehicle speed;
  d) the case where the vehicle speed reaches a predetermined speed (for example, 30 km/h) or below;
  e) the case where cancel switch 135 is pushed; and
  f) the case where cruise ON/OFF switch 134 is turned off.

Note, even after the constant speed running control is released, if the vehicle speed has never reached the predetermined speed (for example, 30 km/h) or below, the constant speed running control is resumed when acceleration resume switch 137 is pushed, provided that cruise ON/OFF switch 134 is not turned off.

Further, in resuming the constant speed running control by the operation of acceleration resume switch 137, it is fundamental that the target vehicle speed in just before the release is again set.

Figure 2:
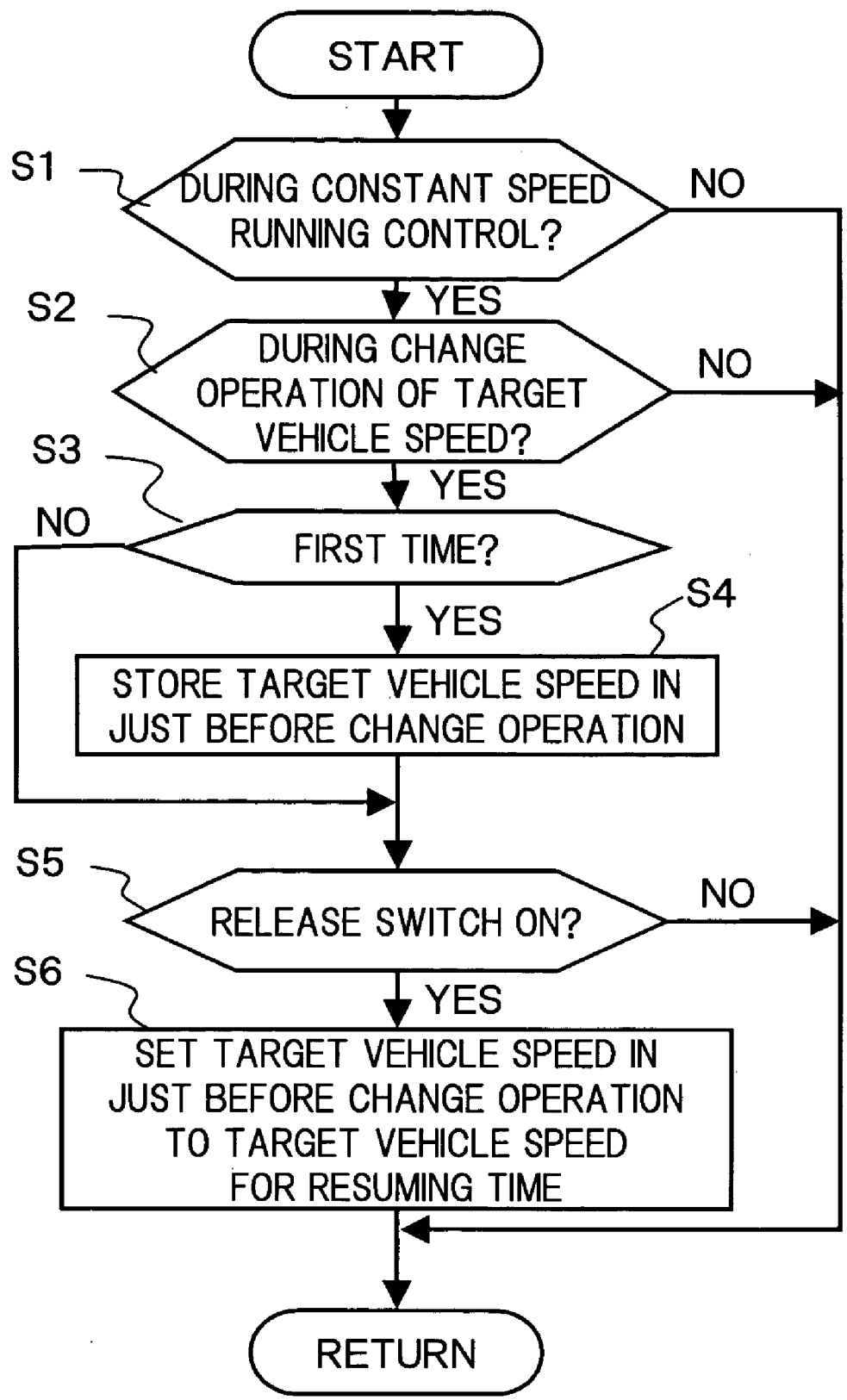
FIG. 2 is a flowchart showing a first embodiment of setting process of target vehicle speed in a constant speed running control.

In the present embodiment, if the constant speed running control is released during the operation of increasing or reducing the target vehicle speed, the target vehicle speed for the resume time is set in accordance with a flowchart of FIG. 2.

In the flowchart of FIG. 2, in step S1, it is judged whether or not the constant speed running is being controlled.

Then, if the constant speed running is being controlled, control proceeds to step S2.

In step S2, it is judged whether or not the operation of increasing the target vehicle speed by continuing to push acceleration resume switch 137 or the operation of reducing the target vehicle speed by continuing to push coast set switch 136 is being performed.

If the operation of increasing or reducing the target vehicle speed is being performed, control proceeds to step S3.

In step S3, it is judged whether or not it is a first time the control proceeds to step S3, and if it is the first time, then control proceeds to step S4, where the target vehicle speed at the time is stored.

Namely, the target vehicle speed stored in step S4 is the target vehicle speed in just before the increasing or reducing operation.

After the target vehicle speed is stored in step S4, control proceeds to step S5, and also if it is judged in step S3 that it is not the first time, control proceeds to step S5.

In step S5, it is judged whether or not at least one of brake switch 131, neutral switch 132 and clutch switch 133, being switches for releasing the constant speed running control, is switched to a release condition.

Namely, it is judged whether or not a driver depressed the brake pedal, or changed the shift position of transmission to the neutral position or turned the clutch off in the manual transmission.

Note, although the constant speed running control is also released by cancel switch 135, the release by cancel switch 135 is eliminated from the judging objects in step S5.

If it is judged in step S5 that at least one of brake switch 131, neutral switch 132 and clutch switch 133 is switched to the release condition, then control proceeds to step S6.

In step S6, the stored target vehicle speed in just before the increasing or reducing operation, is set to the target vehicle speed at the time when the constant speed running control is resumed.

Figure 3:
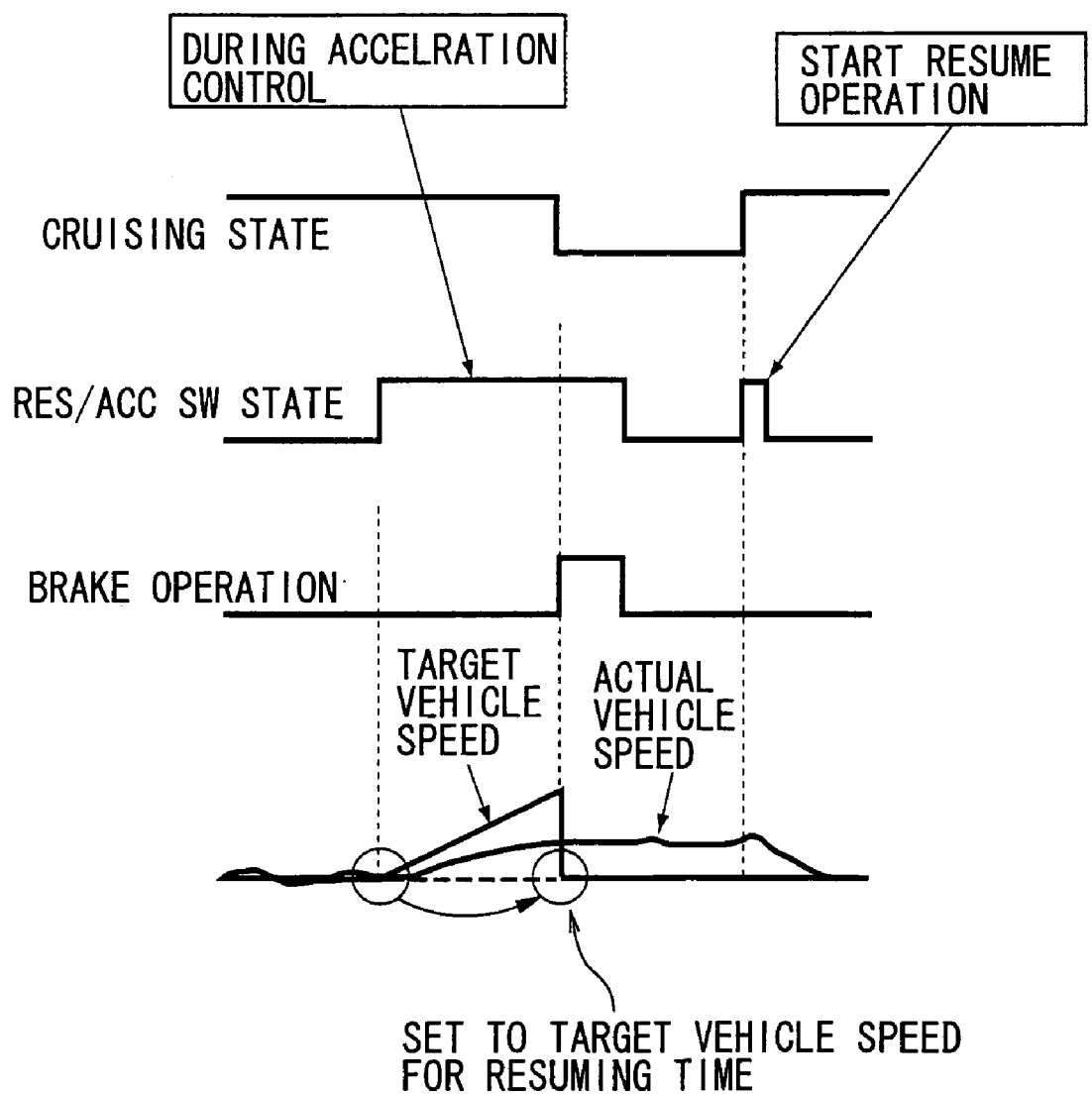
FIG. 3 is a time chart showing a control characteristic in the first embodiment.

For example, in the case where acceleration resume switch 137 continues to be pushed, to increase the target vehicle speed, if the running is on the up-hill, the response of actual vehicle speed to an increase of target vehicle speed may be delayed. If the constant speed running control is released by the braking operation and the like during such an increase of target vehicle speed, the target vehicle speed at such a release time becomes greatly higher than the actual vehicle speed (refer to FIG. 3).

In such a situation, if the target vehicle speed at the release time of constant speed running control is set to the target vehicle speed at the time when the constant speed running control is resumed, there is a possibility that the constant speed running control is resumed with the vehicle speed higher than the driver's intention as a target.

On the contrary, in the case where the constant speed running control is released by the braking operation and the like during the target vehicle speed is being reduced when the running is on the down-hill, the target vehicle speed at the release time of constant speed running control becomes greatly lower than the actual vehicle speed.

Then, in this case, if the target vehicle speed at the release time of constant speed running control is set to the target vehicle speed at the time when the constant speed running control is resumed, there is a possibility that the constant speed running control is resumed with the vehicle speed lower than the driver's intention as a target.

Contrary to the above, as shown in the flowchart of FIG. 2, if the constitution is such that the target vehicle speed in just before the increasing or reducing operation is set to the target vehicle speed at the time when the constant speed running control is resumed, it is avoided that the constant speed running control is resumed with at least the vehicle speed higher than the driver's acceleration intention or the vehicle speed lower than the driver's deceleration intention, as a target.

Note, the constitution may be such that, provided that an absolute value of a deviation between the actual vehicle speed and the target vehicle speed at the release time of the constant speed running control is a predetermined value or above, or the time where the increasing or reducing operation of target vehicle speed continues to be performed is a predetermined time or above, or the increasing operation of target vehicle speed is being performed during up-hill running, or the reducing operation of target vehicle speed is being performed during down-hill running, the target vehicle speed in just before the increasing or reducing operation is performed is set to the target vehicle speed at the time when the constant speed running control is resumed, and under conditions other than the above, the target vehicle speed at the release time is set to the target vehicle speed at the time when the constant speed running control is resumed.

Further, in the above embodiment, the constitution is such that the target vehicle speed in just before the increasing or reducing operation is performed is set to the target vehicle speed at the time when the constant speed running control is resumed. However, the constitution may be such that the actual vehicle speed at the release time of constant speed running during the increasing or reducing operation of the target vehicle speed is set to the target vehicle speed at the time when the constant speed running control is resumed.

A second embodiment having the above constitution will be described in accordance with a flowchart of FIG. 4.

Figure 4:
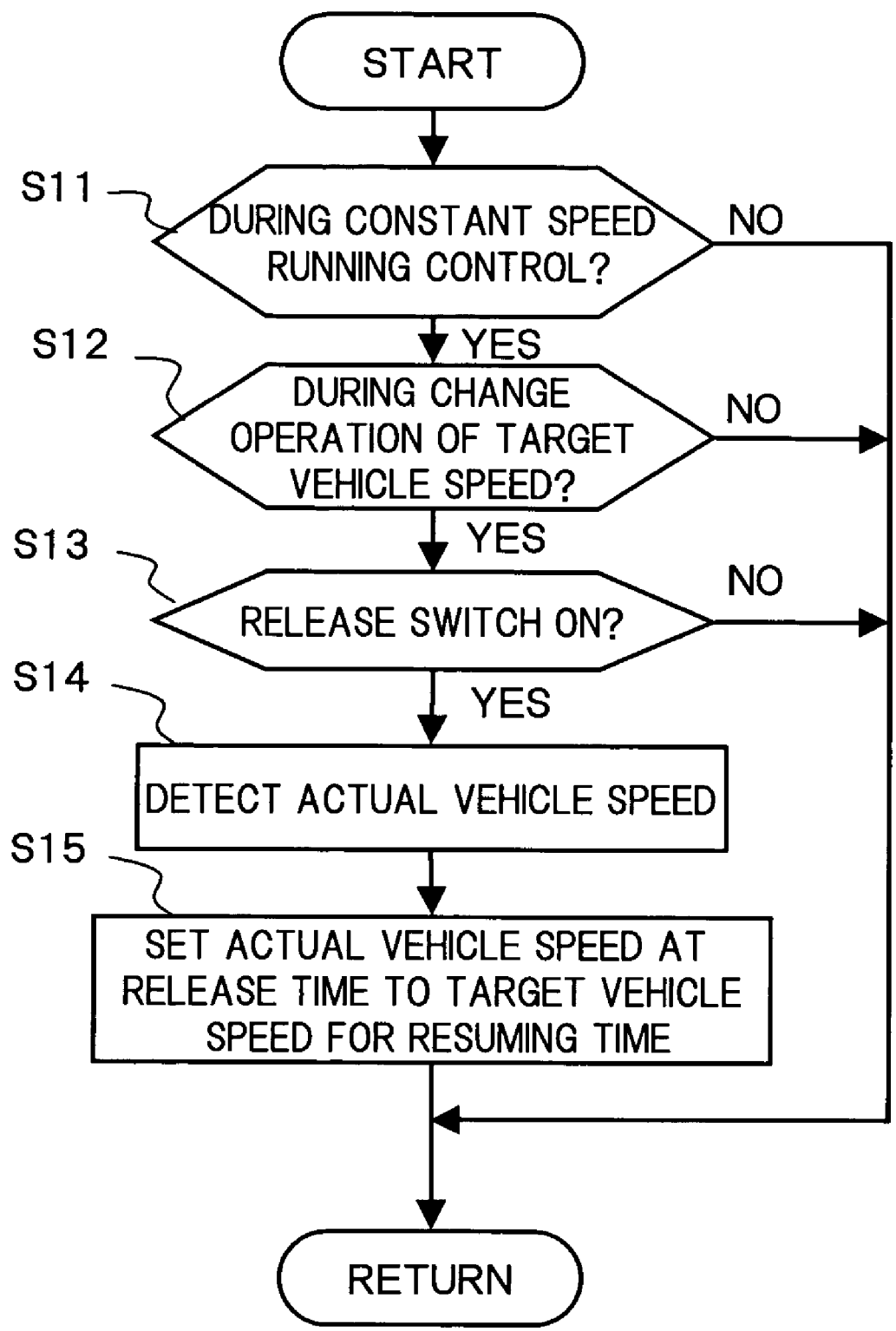
FIG. 4 is a flowchart showing a second embodiment of setting process of target vehicle speed in the constant speed running control.

In the flowchart of FIG. 4, in step S11, it is judged whether or not the constant speed running control is being performed, and if the constant speed running control is being performed, control proceeds to step S12.

In step S12, it is judged whether or not the operation of changing the target vehicle speed by continuing to push acceleration resume switch 137 or coast set switch 136 is being performed.

If the operation of increasing or reducing the target vehicle speed is being performed, control proceeds to step S13, where it is judged whether or not at least one of brake switch 131, neutral switch 132 and clutch switch 133 is switched to the release condition.

Namely, it is judged whether or not the driver depressed the brake pedal, or changed the shift position of transmission to the neutral position, or turned the clutch off in the manual transmission.

If it is judged in step S13 that at least one of brake switch 131, neutral switch 132 and clutch switch 133 is switched to the release condition, control proceeds to step S14.

In step S14, the actual vehicle speed at the release time of the constant speed running control is detected, and in next step S15, the actual vehicle speed is set to the target vehicle speed at the time when the constant speed running control is resumed.

According to such a constitution, if the constant speed running control is resumed, since the constant speed running control is performed with the actual vehicle speed at the release time of the constant speed running control, that is, the vehicle speed at the time where the driver has requested the further increasing or reducing, as a target, it is avoided that the constant speed running control is resumed with at least the vehicle speed higher than the driver's acceleration intention or the vehicle speed lower than the driver's deceleration intention, as a target.

Further, compared with the embodiment shown in the flowchart of FIG. 2, the constant speed running control can be resumed at the target vehicle speed closer to the driver's intention.

The entire contents of Japanese Patent Application No. 2002-382344 filed Dec. 27, 2002, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

What is claimed are:

1. A constant speed running control apparatus for a vehicle comprising:
   an operating section that instructs a change of a target vehicle speed;
   a vehicle speed detecting section that detects a vehicle speed;
   a control section that controls a driving force of the vehicle so as to coincide the vehicle speed detected by said vehicle speed detecting section with said target vehicle speed;
   a releasing section that releases the control of the driving force by said control section under a predetermined condition; and
   a setting section that:
      stores the target vehicle speed immediately before the changing operation of the target vehicle speed; and
      sets, immediately before the release, the stored target vehicle speed as a resumption target vehicle speed that is to be implemented at a time of resumption of the control of the driving force by said control section, when the control of the driving force by said control section is released during the target vehicle speed changing operation.

2. A constant speed running control apparatus for a vehicle according to claim 1, wherein, when the control of the driving force by said control section is released during the target vehicle speed changing operation, said setting section sets an actual vehicle speed at the release time to the target vehicle speed at the time of resuming the control of the driving force by said control section.

3. A constant speed running control apparatus for a vehicle according to claim 1, wherein, when the control of the driving force by said control section is released during the target vehicle speed changing operation, provided that a deviation between the target vehicle speed at the time of resuming and an actual vehicle speed is greater than or equal to a predetermined value, said setting section sets the stored target vehicle speed as a target vehicle speed at the time of resuming the control of the driving force by said control section.

4. A constant speed running control apparatus for a vehicle according to claim 1, wherein said setting section sets the stored target vehicle speed as a target vehicle speed at the time of resuming the control of the driving force by said control section, provided that an increasing operation of the target vehicle speed has been performed during up-hill running.

5. A constant speed running control apparatus for a vehicle according to claim 1, wherein said setting section sets the stored target vehicle speed as a target vehicle speed at the time of resuming the control of the driving force by said control section, provided that a reducing operation of the target vehicle speed has been performed during downhill running.

6. A constant speed running control apparatus for a vehicle according to claim 1, wherein said releasing section releases the control of the driving force by said control section when a brake is operated.

7. A constant speed running control apparatus for a vehicle according to claim 1, wherein said releasing section releases the control of the driving force by said control section when an interruption operation of transmission of the driving force to a driving wheel is performed.

8. A constant speed running control apparatus for a vehicle according to claim 1, wherein said setting section sets the stored target vehicle speed as a target vehicle speed at the time of resuming of the control of the driving force by said control section, provided that the time duration during which the target vehicle speed changing operation has lasted is greater than or equal to a predetermined time duration.

9. A constant speed running control method for a vehicle comprising the steps of:
   instructing a change of a target vehicle speed;
   detecting a vehicle speed;
   controlling a driving force of the vehicle so as to coincide said detected vehicle speed with said target vehicle speed;
   releasing the control of the driving force for obtaining said target vehicle speed under a predetermined condition;
   storing the target vehicle speed change immediately before the changing operation of the target vehicle speed; and
   setting, immediately before the release, the stored target vehicle speed as a resumption target vehicle speed that is to be implemented at a time of resumption of the control of the driving force, when the control of the driving force is released during the target vehicle speed changing operation.

10. A constant speed running control method for a vehicle according to claim 9, wherein said step of setting the target vehicle speed at the time of resuming comprises the steps of:
   when the control of the driving force for obtaining said target vehicle speed is released during the target vehicle speed instructing step, detecting a vehicle speed at the time; and
   setting the detected vehicle speed to the target vehicle speed at the time of resuming the control of the driving force for obtaining said target vehicle speed.

11. A constant speed running control method for a vehicle according to claim 9, wherein said step of setting the target vehicle speed at the time of resumption comprises the steps of:
   calculating a deviation between the target vehicle speed at the time of resumption and an actual vehicle speed when the control of the driving force for obtaining said target vehicle speed is released during the changing operation of the target vehicle speed; and
   setting the stored vehicle speed as a target vehicle speed at the time of resuming the control of the driving force for obtaining said target vehicle speed, when said deviation is greater than or equal to a predetermined value.

12. A constant speed running control method for a vehicle according to claim 9, wherein said step of setting the target vehicle speed at the time of resuming time-comprises the steps of:
   judging whether or not a target vehicle speed increasing operation has been performed during an up-hill running; and
   setting the stored target vehicle speed as a target vehicle speed at the time of resuming the control of the driving force for obtaining said target vehicle speed, when the target vehicle speed increasing operation has been performed during the up-hill running.

13. A constant speed running control method for a vehicle according to claim 9, wherein said step of setting the target vehicle speed at the time of resuming time comprises the steps of:
   judging whether or not a target vehicle speed reduction operation has been performed during a down-hill running; and
   setting the stored target vehicle speed as a target vehicle speed at the time of resuming the control of the driving force for obtaining said target vehicle speed, when the target vehicle speed reduction operation has been performed during the down-hill running.

14. A constant speed running control method for a vehicle according to claim 9, wherein said step of releasing the control of the driving force for obtaining said target vehicle speed under the predetermined condition comprises the steps of:
   detecting whether or not a braking operation is performed; and
   releasing the control of the driving force for obtaining said target vehicle speed, when the braking operation is performed.

15. A constant speed running control method for a vehicle according to claim 9, wherein said step of releasing the control of the driving force for obtaining said target vehicle speed under the predetermined condition comprises the steps of:
   detecting whether or not an interruption operation of a transmission of the driving force to a driving wheel is performed; and
   releasing the control of the driving force for obtaining said target vehicle speed, when the interruption operation of the transmission of the driving force to the driving wheel is performed.

16. A constant speed running control method for a vehicle according to claim 9, wherein the step of setting the target vehicle speed at the time of resuming comprises the steps of:
   measuring a time duration during which the target vehicle speed changing operation has been performed continuously; and
   setting the vehicle speed as a target vehicle speed at the time of resuming of the control of the driving force for obtaining said target vehicle speed, when the measured time duration is greater than or equal to a predetermined time duration.

17. A constant speed running control apparatus for a vehicle comprising:
   an operating section that instructs a change of a target vehicle speed;
   a vehicle speed detecting section that detects a vehicle speed;
   a control section that controls a driving force of the vehicle so as to coincide the vehicle speed detected by said vehicle speed detecting section with said target vehicle speed;
   a releasing section that releases the control of the driving force by said control section under a predetermined condition; and a setting section that sets a vehicle speed, delayed in following the change instruction by said operating section, as a target vehicle speed at the time of resuming the control of the driving force by said control section, when the control of the driving force by said control section is released during a changing operation of a target vehicle speed and when a time duration during which the target vehicle speed changing operation has lasted is greater than or equal to a predetermined time duration.

18. A constant speed running control apparatus for a vehicle, comprising:

operating means for instructing a change of a target vehicle speed;

vehicle speed detecting means for detecting a vehicle speed;

control means for controlling a driving force of the vehicle so as to coincide the vehicle speed detected by said vehicle speed detecting means with said target vehicle speed;

releasing means for releasing the control of the driving force by said control means under a predetermined condition; and setting means for:
storing the target vehicle speed immediately before the changing operation of the target vehicle speed; and
setting, immediately before the release, the stored target vehicle speed as a resumption target vehicle speed that is to be implemented at a time of resumption of the control of the driving force by said control means, a when the control of the driving force by said control means is released during the target vehicle speed changing operation.

19. A constant speed running control method for a vehicle comprising the steps of:

instructing a change of a target vehicle speed;

detecting a vehicle speed;

controlling a driving force of the vehicle so as to coincide said detected vehicle speed with said target vehicle speed;

releasing the control of the driving force for obtaining said target vehicle speed under a predetermined condition;

measuring a time duration in which the changing operation of the target vehicle speed has been performed continuously; and setting the vehicle speed, delayed in following the target vehicle speed change instruction, as a target vehicle speed at a time of resuming the control of the driving force for obtaining said target vehicle speed, when the control of the driving force for obtaining said target vehicle speed is released during the instructing step, and when the measured time duration is greater than or equal to a predetermined time duration.

* * * * *